(12) United States Patent
Terada

(10) Patent No.: US 7,593,634 B2
(45) Date of Patent: Sep. 22, 2009

(54) DIGITAL CAMERA

(75) Inventor: Hiroshi Terada, Mitaka (JP)

(73) Assignee: Olympus Imaging Corp., Tokyo (JP)

( * ) Notice: Subject to any disclaimer, the term of this patent is extended or adjusted under 35 U.S.C. 154(b) by 409 days.

(21) Appl. No.: 11/448,637

(22) Filed: Jun. 7, 2006

(65) Prior Publication Data

US 2006/0291847 A1    Dec. 28, 2006

(30) Foreign Application Priority Data

Jun. 27, 2005    (JP)    ............................. 2005-186714

(51) Int. Cl.
   *G03B 7/85*    (2006.01)
(52) U.S. Cl. ........................ 396/257; 348/366
(58) Field of Classification Search ................. 396/170, 396/257–262, 505, 529; 348/360–366; 359/241, 359/739
See application file for complete search history.

(56) References Cited

U.S. PATENT DOCUMENTS 5,867,737 A * 2/1999 Shiokama ................... 396/237
5,999,753 A * 12/1999 Hirai et al. .................. 396/227
2001/0026683 A1 * 10/2001 Morimoto et al. ............. 396/89
2006/0158546 A1 * 7/2006 Hirai ........................... 348/335

FOREIGN PATENT DOCUMENTS

JP    61163327 A    *    7/1986
JP    2000-165730      6/2000

* cited by examiner

*Primary Examiner*—Melissa J Koval
*Assistant Examiner*—Autumn Parker
(74) *Attorney, Agent, or Firm*—Straub and Pokotylo; John C. Pokotylo

(57) ABSTRACT

The present invention discloses a digital camera having a live view mode for continuously capturing and displaying a series of subject images, in which when the live view mode is selected, a computation part initializes an aperture mechanism based on photographing lens-specific information. Since the aperture mechanism is controlled based on the photographing lens-specific information in a live-view initialization process, the possibility of damaging an imager while a photographer is framing a picture can be reduced. The photographing lens-specific information includes, for example, focal length information and maximum aperture value information. The computation part can be configured, for example, to initialize the aperture mechanism in such a manner that the amount of light from the sun per unit area, or the total amount of light from the sun, will always become almost equal regardless of the kind of photographing lens.

4 Claims, 10 Drawing Sheets

DIGITAL CAMERA

CROSS-REFERENCE TO RELATED APPLICATION

This application is based upon and claims the benefit of priority from prior Japanese Patent Application No. 2005-186714, filed Jun. 27, 2005, the entire contents of which are incorporated herein by reference.

BACKGROUND OF THE INVENTION

1. Field of the Invention

The present invention relates to a digital camera, and more particularly, to the improvement of a single-lens reflex digital camera capable of displaying on a display screen both an image being viewed and an image being shot.

2. Description of the Related Art

Cameras are commonly known, which form an optical image of a subject on an image pickup device from light coming from the subject and passing through a photographing optical system, photoelectrically convert the optical image into electric image signals through the image pickup device, and display the resulting image on the screen of an image display device, such as an LCD monitor, based on the electric image signals.

As an example of such digital cameras displaying a subject image, there is known a type of camera, which is provided with an image pickup device for monitoring a subject field, that is, for displaying a live view (a real-time moving picture), separately from an image pickup device for actual exposure. In this type of camera, a half mirror is arranged in a finder optical system to guide a light beam of the subject to the image pickup device for live view display. In a live view mode, the image pickup device for live view display repeats imaging to display a live view on a display device (for example, see Japanese Patent Laid-Open No. 2000-165730).

Suppose here that a bright lens having a small f-number or a telephoto lens is mounted on a lens-interchangeable single-lens reflex digital camera (hereinafter simply called an "SLR camera") as one type of digital camera. In this case, if the sun is included in a frame, it could cause damage to an imager. Especially, an SLR camera with live view capability is more likely to damage its imager because the imager continues to be exposed during framing.

BRIEF SUMMARY OF THE INVENTION

The digital camera of the present invention has a live view mode for continuously capturing and displaying a series of subject images. When the live view mode is selected, an aperture mechanism is initialized based on photographing lens-specific information.

Since the aperture mechanism is controlled based on the photographing lens-specific information in a live-view initialization process, the possibility of damaging an imager while a photographer is framing a picture can be reduced.

As an exemplary structure of the present invention, a digital camera having a live view mode for continuously capturing and displaying a series of subject images comprises: a memory part storing photographing lens-specific information; an aperture mechanism for adjusting the amount of incident light from a subject; and a computation part for controlling the aperture mechanism, wherein when the live view is selected, the computation part reads the photographing lens-specific information from the memory part to initialize the aperture mechanism based on the photographing lens-specific information.

The photographing lens-specific information includes, for example, focal length information and maximum aperture value information. The computation part can be configured, for example, to initialize the aperture mechanism in such a manner that the amount of light from the sun per unit area, or the total amount of light from the sun, will always become almost equal regardless of the kind of photographing lens.

The digital camera can also be configured to further comprise a light metering part for measuring the brightness of the subject, wherein the computation part changes the set aperture value of the aperture mechanism based on the light metering results from the light metering part whenever necessary during the live view mode.

According to the present invention, there can be provided a digital camera, especially a single-lens reflex camera capable of displaying a live view, which is much less likely to damage its imager during framing.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

First Embodiment

Figure 1:
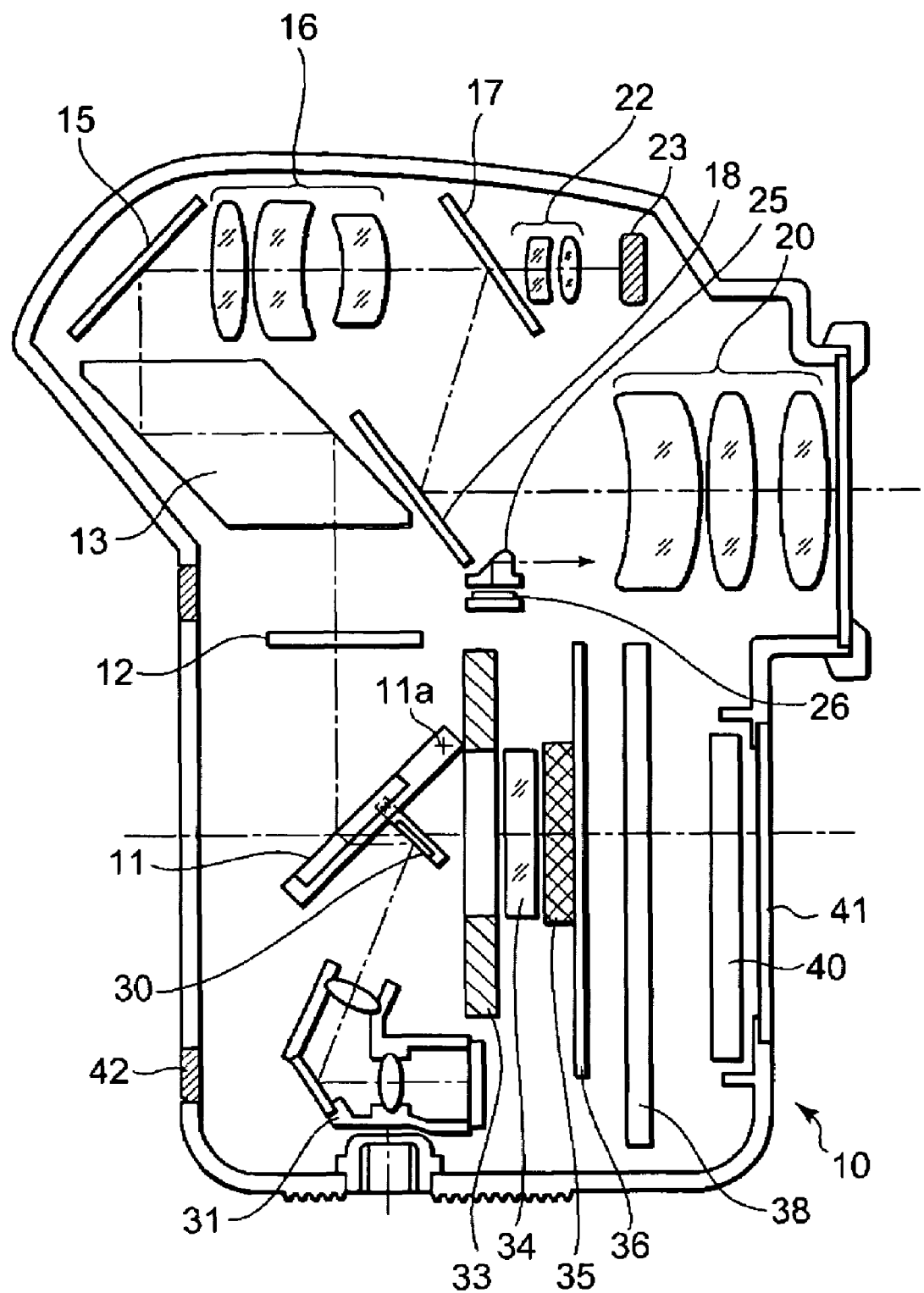
FIG. 1 is a sectional view showing the structure of the body section of a single-lens reflex digital camera according to a first embodiment of the present invention, in which the camera state during viewing of a subject field is shown.
Figure 2:
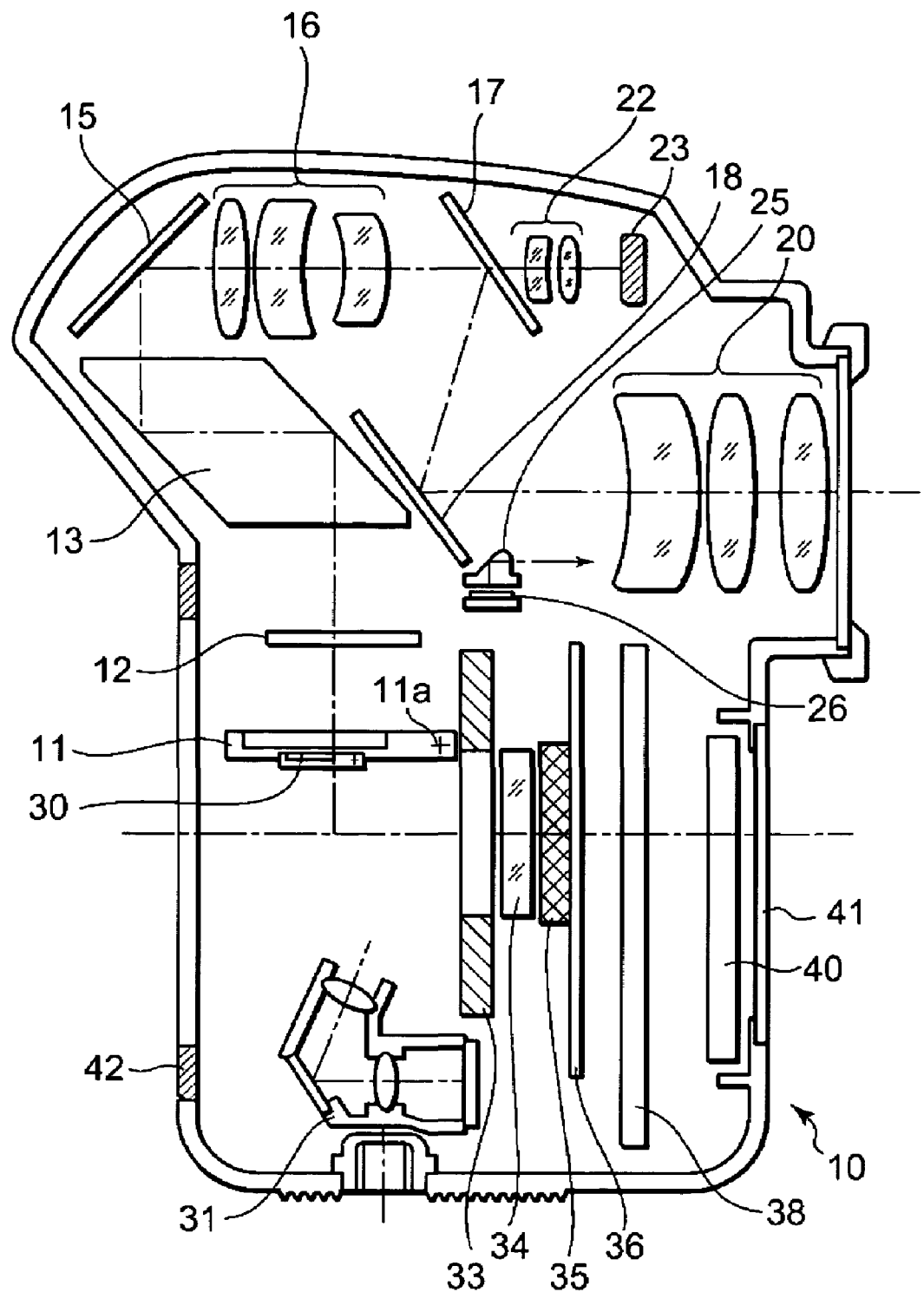
FIG. 2 is a sectional view showing the structure of the body section of the single-lens reflex digital camera according to the first embodiment of the present invention, in which the camera state upon shooting is shown.
Figure 3:
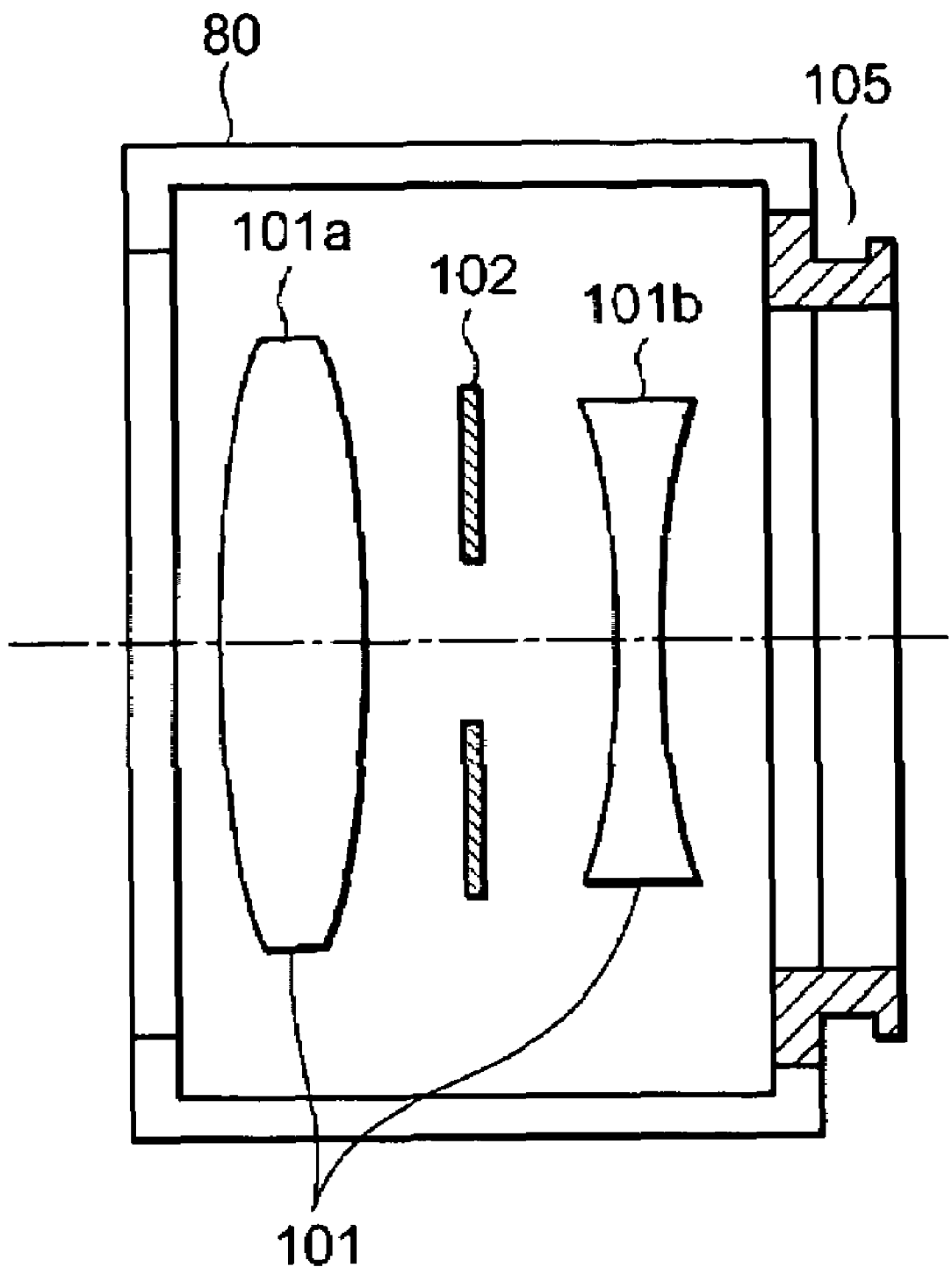
FIG. 3 is a sectional view showing the structure of an interchangeable lens of the single-lens reflex digital camera according to the first embodiment of the present invention.

FIGS. 1 and 2 are sectional views showing the structure of the body section of a single-lens reflex digital camera according to a first embodiment of the present invention. FIG. 1 shows the camera state during viewing of a subject field, and FIG. 2 shows the camera state upon shooting. Further, FIG. 3 is a sectional view showing the structure of an interchangeable lens of the single-lens reflex digital camera according to the embodiment.

In FIGS. 1 and 2, this single-lens reflex digital camera (hereinafter simply called the "camera") consists principally of a camera body 10 as a camera body section and an interchangeable lens 80 shown in FIG. 3. Any desired interchangeable lens 80 can be removably set on a body mount 42 provided on the front of the camera body 10.

In FIG. 1, a light beam coming from a subject through the interchangeable lens 80 (not shown) is reflected on the surface of a main mirror 11, part of which is formed into a half mirror, and is incident on a prism 13 through a screen 12. The light beam of the subject incident on the prism 13 is reflected on reflection surfaces inside the prism 13 and a mirror A (hereinafter called the mirror (A)) 15, passes through a relay lens 16 consisting of a plurality of lenses, and is reflected by a mirror B (hereinafter called the mirror (B)) 17 and a mirror C (hereinafter called the mirror (C)) 18. The light beam of the subject reflected by the mirror (C) 18 passes through an eyepiece lens 20 consisting of a plurality of lenses so that it will be observed by a photographer's eye (not shown). The prism 13, the mirror (A) 15, the relay lens 16, the mirror (B) 17, and the mirror (C) 18 constitute a relay optical system. Through the relay optical system, the subject image formed on the screen 12 is re-formed between the mirror (C) 18 and the eyepiece lens 20.

The mirror (B) 17 is a half mirror so that part of the incident light will pass through the mirror (B) 17 and be guided to a sub-imager 23 through an image re-forming lens 22 arranged behind the mirror (B) 17. The sub-imager 23 is a second image pickup device, while an imager 35 to be described later is a first image pickup device. Further, a finder LCD 26 for displaying shooting information and the like in a viewfinder, and a display prism 25 for guiding the shooting information and the like displayed on the finder LCD 26 to the photographer's eye through the eyepiece lens 20 are arranged near the mirror (C) 18.

The light beam of the subject that passed through the main mirror 11 is reflected by a sub-mirror 30 attached to the backside of the main mirror 11, and guided to an AF/AE unit 31 as a measurement part for auto focusing and light metering.

The main mirror 11 is an optical-path changing element provided rotatably about an axis 11a. During viewing of a subject field, the main mirror 11 is at a position as shown in FIG. 1. Then, at the time of shooting, it is moved upward about the axis 11a so that it comes to a position (retracted position) retracted from the shooting optical path as shown in FIG. 2. When the main mirror 11 is moved to its retracted position, the sub-mirror 30 is folded over and moved together with the main mirror 11 to the retracted position.

A focal-plane shutter 33, a low-pass filter 34, and the imager 35 as the first image pickup device mounted on an imager plate 36 are arranged behind the main mirror 11 along the shooting optical path. A substrate 38 on which various electronic parts are mounted is arranged behind the imager plate 36. Further, a monitor 40 such as an LCD is arranged behind the substrate 38. The photographer can view an image displayed on the screen of the monitor 40 through a monitor window 41 provided on the back face of the camera body 10.

On the other hand, the interchangeable lens 80 is configured as shown in FIG. 3.

The interchangeable lens 80 incorporates a photographing lens 101 including a focus lens 101a and a zoom lens 101b. An aperture (aperture mechanism) 102 as a light amount adjustment/control part is arranged between the focus lens 101a and the zoom lens 101b. Further, a lens mount 105 on the lens side is provided around the outer circumference of the interchangeable lens 80 on the side to face the camera body 10, not shown in FIG. 3, so that it will be engaged with the body mount 42. The engagement between the body mount 42 and the lens mount 105 ensures that the interchangeable lens 80 is removably mounted on the camera body 10.

Figure 4:
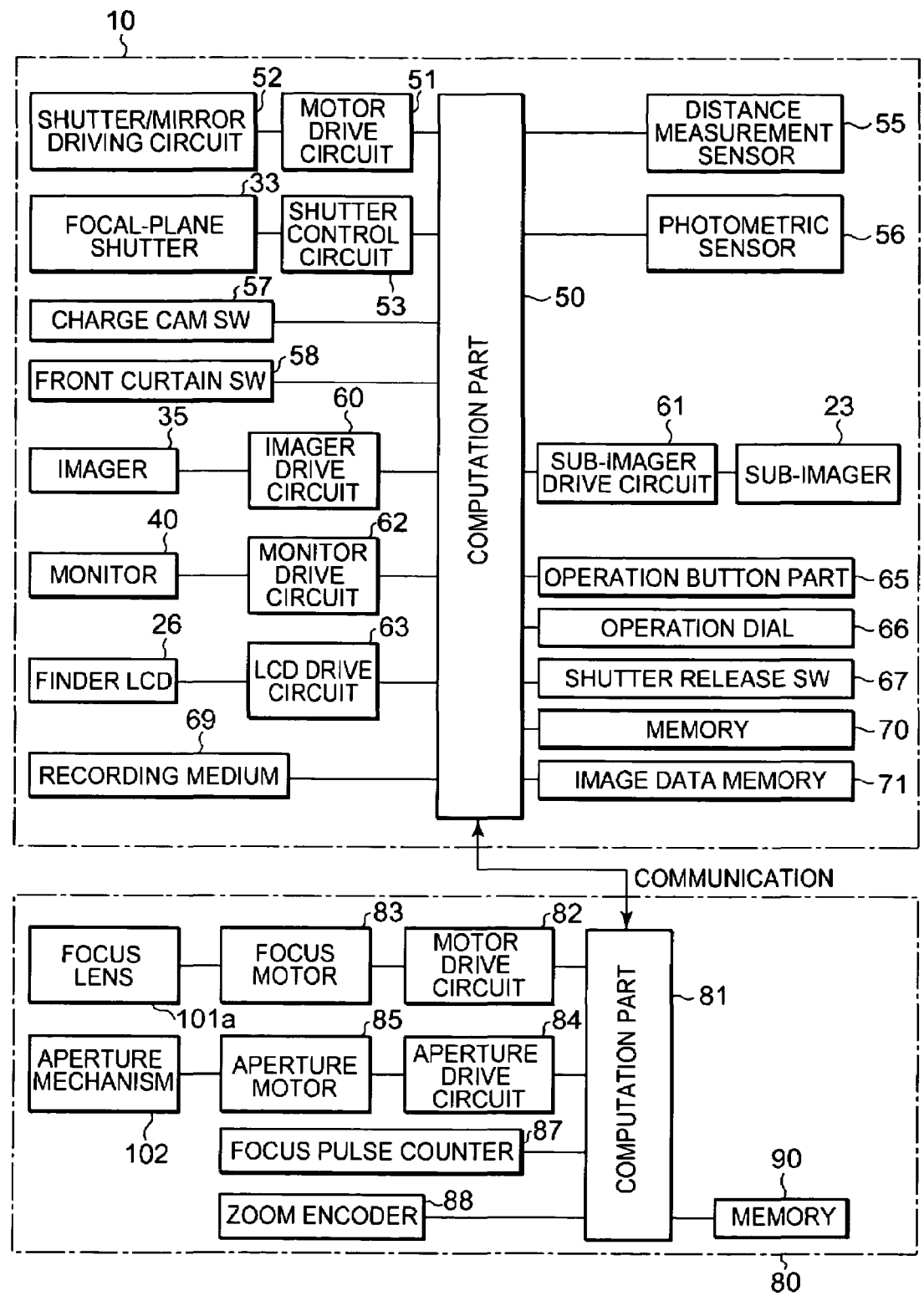
FIG. 4 is a block diagram showing the structure of an electric system of the single-lens reflex digital camera according to the first embodiment of the present invention.

FIG. 4 is a block diagram showing the structure of an electric system of the single-lens reflex digital camera according to the embodiment of the present invention. This block diagram shows a state in which an interchangeable lens is mounted on the camera.

In FIG. 4, a computation part 50 not only controls the entire operation of the camera, but also performs computations. The computation part 50, consisting, for example, of a CPU and the like, has a data acquiring function, a setting function, a selection function, and a control function. A shutter/mirror driving motor 52 is connected to the computation part 50 through a motor drive circuit 51. The focal-plane shutter 33 is also connected to the computation part 50 through a shutter control circuit 53.

Further, a distance measurement sensor (distance measurement part) 55, a photometric sensor (light metering part) 56, a charge cam switch (SW) 57, a front curtain switch (SW) 58, an imager drive circuit 60, a monitor drive circuit 62, and an LCD drive circuit 63 are connected to the computation part 50. The distance measurement sensor 55 is provided inside the AF/AE unit 31. The photometric sensor 56 measures the brightness of a subject. The charge cam switch 57 changes its states when the shutter is charged. The front curtain switch 58 is attached to a front curtain (not shown) of the focal-plane shutter 33 to detect the full-open state of the opening of the shutter. The imager drive circuit 60 drives the imager 35. The sub-imager drive circuit 61 drives the sub-imager 23. The monitor drive circuit 62 drives the monitor 40. The LCD drive circuit 63 drives the finder LCD 26.

In addition, an operation button part 65, an operation dial 66, shutter release switches (SW) 67, a recording medium 69, a memory 70, and an image data memory 71 are connected to the computation part 50. The operation button part 65 includes a menu button, an arrow pad, an OK button, etc., not shown, which are used to instruct the camera to perform various operations. The operation dial 66 is a selection part for allowing a user to select a mode or option, such as a shooting mode upon shooting or a live view mode.

The shutter release switches 67 assume the form of a shutter button to cause the camera to perform shooting preparation and exposure operations. The shutter release switches 67 are two-step switches, namely a first shutter release switch and a second shutter release switch. When the shutter button (not shown) is pressed halfway, the first shutter release switch is turned on to perform shooting preparation operations, such as light metering and shooting distance measurement. Then, when the shutter button is pressed fully, the second shutter release switch is turned on to make an exposure.

The recording medium 69 is a recording medium such as one of various types of memory cards removably inserted into the camera body 10 through a camera interface (not shown), or an external hard disk drive (HDD). The memory 70 pre-stores a control program for controlling the entire operation of the digital camera. The image data memory 71 is a memory for temporary storage of image data.

On the other hand, the interchangeable lens 80 has a computation part 81, consisting, for example, of a CPU and the like, for controlling the drive of each component of the interchangeable lens 80. A focus motor 83 through a motor drive circuit 82, an aperture motor 85 through an aperture drive circuit 84, a focus pulse counter 87, a zoom encoder 88, and a memory 90 are connected to the computation part 81.

The focus motor 83 is a motor for driving the focus lens 101a based on the distance measurement result from the distance measurement sensor 55 in the camera body 10. Similarly, the aperture motor 85 is a motor for driving the aperture 102 as the light amount adjustment/control part based on the light metering result from the photometric sensor 56 in the camera body 10. The focus pulse counter 87 detects the movement of the focus lens to control the driving amount of the focus lens, that is, the position of the focus lens to be driven. The zoom encoder 88 detects a moving signal according to the focal length of the photographing lens (not shown) to output the moving signal to the computation part 81. The memory 90 is a storage part in which lens information on the interchangeable lens 80 is stored.

The computation part 81 is electrically connected to the computation part 50 in the camera body 10 through a communication connector (not shown) or the like. The computation part 81 is controlled in accordance with instructions from the computation part 50 of the camera body 10.

The following describes the operation of the camera according to the first embodiment of the present invention.

Figure 5:
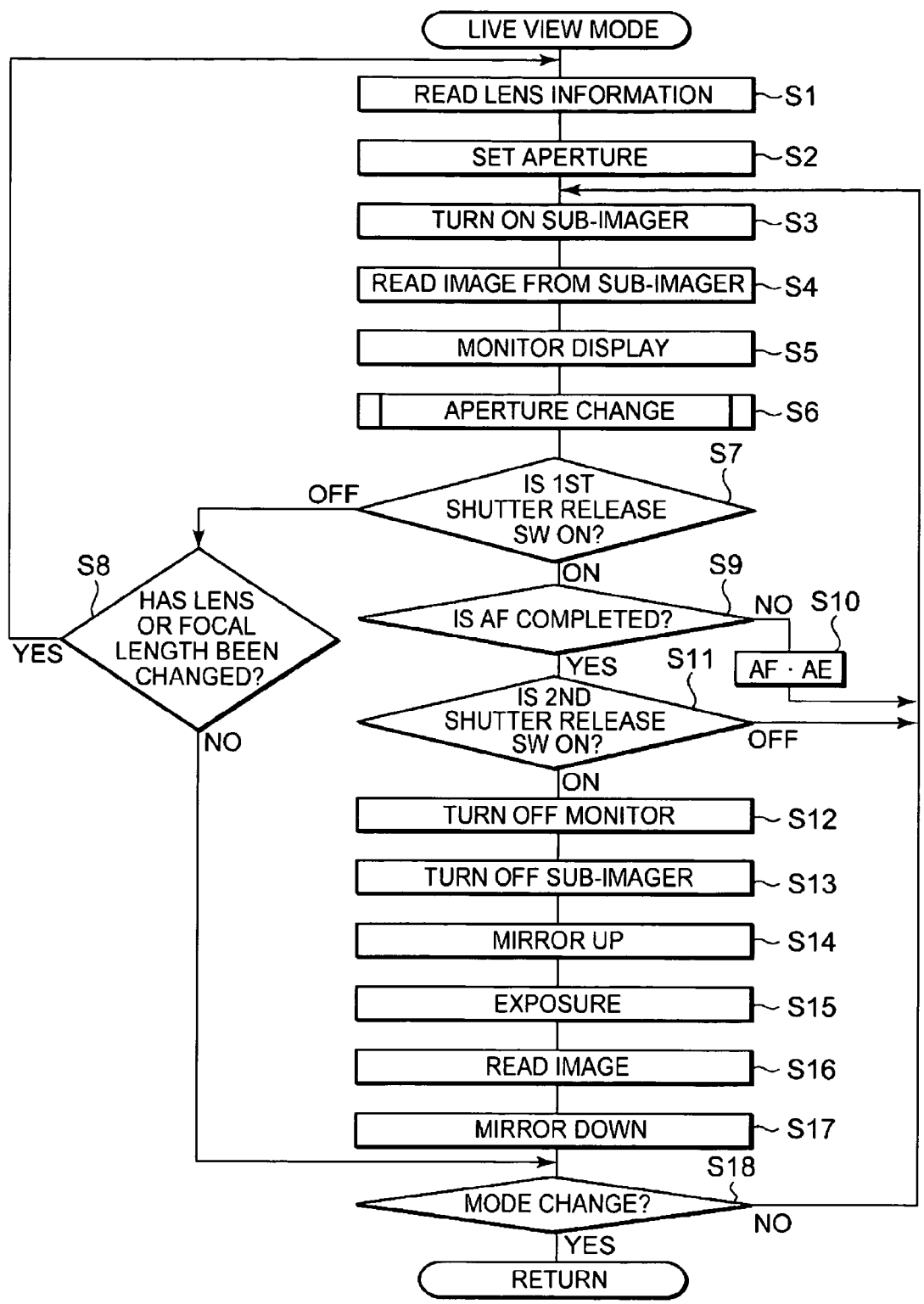
FIG. 5 is a flowchart for explaining the operation of the camera in a live view mode according to the first embodiment of the present invention.

When the operation dial 66 is operated to select the live view mode, the camera enters the live view mode to call a sub-routine for the live view mode shown in FIG. 5 from a main routine (not shown).

FIG. 5 is a flowchart for explaining the operation of the camera in the live view mode according to the first embodiment of the present invention. This operation of the camera is performed primarily under the control of the computation part 50 in the camera body 10.

When the computation part 50 enters the routine of the live view mode, communication is first performed in step S1 with the side of the interchangeable lens 80 to read, from the computation part 81, the lens information (photographing lens-specific information) on the interchangeable lens 80. The lens information includes, for example, information on the minimum aperture, the maximum aperture, the focal length, etc., of the interchangeable lens 80. Then, in step S2, based on the focal length information and the maximum aperture value information included in the photographing lens-specific information, the aperture 102 is initialized so that the amount of light from the sun per unit area, or the total amount of light from the sun, will always become almost equal regardless of the kind of photographing lens. Here, an aperture value other than the maximum is set. This initialization procedure will be described later with reference to Tables 1 to 3. Note that, if the initialization is done for a second or further time, the initial aperture value is set according to the aperture value changed in a sub-routine "Aperture Change" in step S6 to be described later.

In step S3, the sub-imager 23 is turned on through the sub-imager drive circuit 61, and in step S4, a subject image captured by the sub-imager 23 is read. Then, in step S5, the subject image read in step S4 is displayed on the monitor 40. Thus, a live view is displayed through the sub-imager 23. Next, in step S6, the sub-routine "Aperture Change" is executed.

Figure 6:
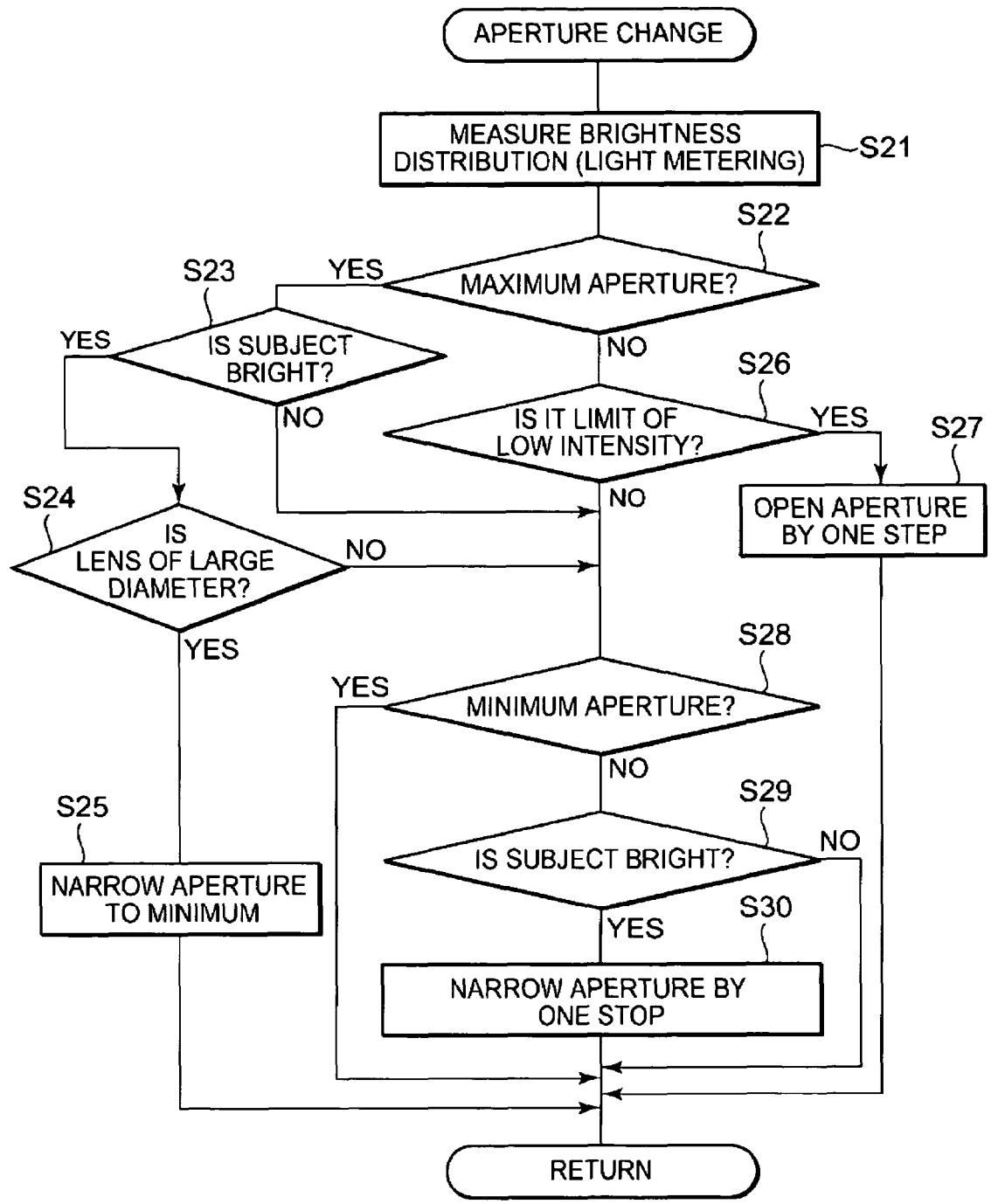
FIG. 6 is a flowchart for explaining the detailed operation of a sub-routine "Aperture Change" in step S6 of the flowchart of FIG. 5.

Referring next to a flowchart of FIG. 6, the details of the sub-routine "Aperture Change" executed in step S6 of the flowchart of FIG. 5 will be described.

In this sub-routine, the photometric sensor 56 first measures a brightness distribution in step S21. Then, it is determined in step S22 whether the current aperture value is the maximum or not. If the aperture is set to its maximum open position, the procedure proceeds to step S23, while if not, the procedure shifts to step S26.

In step S23, it is determined whether the subject is bright or not. Here, for example, it is determined whether the saturation range of the subject in the brightness distribution is 50 percent or more. As a result, if the subject is determined to be bright, the procedure proceeds to step S24. In step 24, it is determined whether the interchangeable lens 80 mounted on the camera body 10 is of a large diameter, that is, it is determined whether the minimum f-number is, for example, smaller than 2.0. If the interchangeable lens 80 is a lens having a large diameter, the procedure proceeds to step S25 to narrow the aperture 102 to the minimum. After that, the procedure returns from this routine to step S7 of the flowchart of FIG. 5. Note that although the aperture is narrowed to the minimum in step S25, the aperture may be stopped down to an aperture value that does not affect the imager 35, for example, to f/8.0.

On the other hand, in step S26, it is determined whether the brightness of the subject comes to the limit of low intensity. If it is the limit of low intensity, the procedure proceeds to step S27 to open the aperture 102 by one stop. After that, the procedure returns from this routine to step S7 of the flowchart of FIG. 5.

If it is not the limit of low intensity in step 26, or if the subject is not bright in step S23, or if the lens is not of a large diameter in step S24, the procedure shifts to step S28 to determine whether the aperture 102 is the minimum aperture. As a result of determination, if the aperture 102 is the minimum aperture, the procedure exits from this routine, while if it is not the minimum aperture, the procedure proceeds to step S29. In step S29, it is determined whether the subject is bright. If the subject is bright, the procedure proceeds to step S30 to narrow the aperture 102 by one stop. After that, the procedure returns from this routine to step S7 of the flowchart of FIG. 5. On the other hand, if it is determined in step S29 that the subject is not bright, the procedure skips step S30 and exists from this routine.

Note that although the aperture 102 is moved by one stop in steps S27 and S30, it may be moved by more than one stop.

After execution of the "Aperture Change" process in step S6, the on-state of the first shutter release switch in the two-step shutter release switches 67 corresponding to the half-press state of the shutter button is determined in step S7. If the first shutter release switch is not on-state, the procedure proceeds to step S8 to determine whether the lens has been change or the focal length has been changed. If either of them has been changed, the procedure returns to step S1 to repeat the above-mentioned processing, while if nothing has been changed, the procedure shifts to step S18 to be described later.

On the other hand, if the first shutter release switch is turned on in step S7, the procedure proceeds to step S9 to determine the state of AF. As a result, if AF is not completed yet, the procedure proceeds to step S10 to execute AF and AE. After that, the procedure returns to step S3 to repeat the above-mentioned processing. When AF is completed in step S9, the procedure proceeds to step S11 to determine the state of the second shutter release switch. If the second shutter release switch is not on-state, the procedure returns to step S3 to repeat the above-mentioned processing.

On the other hand, if the second shutter release switch is turned on in step S11, the procedure proceeds to step S12 to turn off the monitor 40. Then, in step S13, the drive of the sub-imager 23 is stopped. Then, in step S14, the shutter/mirror driving motor 52 moves the main mirror 11 up. In other words, the main mirror 11 is moved from the shooting optical path as shown in FIG. 1 to the retracted position as shown in FIG. 2. Further, in step S15, the imager 35 is exposed to light to capture a subject image. Then, in step S16, the subject image captured is read.

After that, in step S17, the shutter/mirror driving motor 52 moves the main mirror 11 down (to return to the shooting optical path shown in FIG. 1 from the retracted position shown in FIG. 2). Then, it is determined in step S18 whether the mode has been changed. If the camera is still in the live view without any mode change, the procedure returns to step S3 to repeat the above-mentioned processing. On the other hand, if the mode has been changed, the procedure exists from this routine and returns to the main routine.

Referring next to Tables 1 to 3, the specifications of some interchangeable lenses 80 and their relations with aperture values set in the live view mode will be described.

The following Table 1 shows an example in which the aperture values are so set that the amounts of light coming from the sun and incident into these lenses per unit area will be almost equal to one another.

TABLE 1

| Interchangeable Lens Specifications | | Set Aperture Value (F-Number) in Live View Mode |
|---|---|---|
| Focal Length | Maximum Aperture | |
| 50 mm | 2.0 | 4.0 |
| 150 mm | 2.0 | 4.0 |
| 300 mm | 2.8 | 4.0 |

For example, when the maximum apertures of the interchangeable lenses 80 with focal lengths of 50 mm, 150 mm, and 300 mm are f/2.0, f/2.0, and f/2.8, respectively, the aperture values set in the live view mode are all f/4.0.

The following Table 2 shows another example in which the aperture values are so set that the total amounts of light coming from the sun and incident into these lenses will be almost equal to one another.

TABLE 2

| Interchangeable Lens Specifications | | Set Aperture Value (F-Number) in Live View Mode |
|---|---|---|
| Focal Length | Maximum Aperture | |
| 50 mm | 2.0 | 2.8 |
| 150 mm | 2.0 | 8.4 |
| 300 mm | 2.8 | 16.8 |

For example, when the maximum apertures of the interchangeable lenses 80 with focal lengths of 50 mm, 150 mm, and 300 mm are f/2.0, f/2.0, and f/2.8, the aperture values set in the live view mode are f/2.8, f/8.4, and f/16.8, respectively.

If the focal length of a reference lens is f, the f-stop number set for the lens in the live view mode is $F_N$, the focal length of each of the other lenses is f', and the f-stop number set for the lens in the live view mode is $F_N'$, an estimate of the ratio of sunlight incident into the lens is determined as follows:

$$(f'/f_{50})^2 = 2^x$$

where x is the number of EV (Exposure Value) steps for the amount of light incident on the lens with f=50 mm.

For example, if f'=150 mm, $$(150/50)^2 = 2^x,$$

then x=3.17 (EV).

Since the aperture value set for f=50 is $F_N$=2.8, the aperture value set for f=150 is $$2^{3.17} = (F_N'/F_N)^2$$

then $F_N'$=8.4.

Since $F_N'/F_N = (f'/f)$, $F_N'/f' = F_N/f$ = Constant.

Taking Table 2 as an example, the constant value for 50 mm is $$F_N/f = 0.056.$$

If $F_N$ is 4.0, the constant value is 0.08, while if $F_N$ is 5.6, the constant value is 0.11. The range is between about 0.05 to 0.11.

The following Table 3 shows still another example in which the aperture values are so set that the total amounts of light coming from the sun and incident into these lenses will be almost equal to one another within such a range that the aperture is not narrowed down beyond the constant value according to the following equation:

$$2^{3.17} = (F_N'/F_N)^2$$

TABLE 3

| Interchangeable Lens Specifications | | $F_N$ Calculated Value in Live View Mode | Set Aperture Value (F-Number) in Live View Mode |
|---|---|---|---|
| Focal Length | Maximum Aperture | | |
| 50 mm | 2.0 | 2.8 | 2.8 |
| 150 mm | 2.0 | 8.4 | 8.0 |
| 300 mm | 2.8 | 16.8 | 8.0 |

For example, when the maximum apertures of the interchangeable lenses 80 with focal lengths of 50 mm, 150 mm, and 300 mm are f/2.0, f/2.0, and f/2.8, the $F_N$ calculated values in the live view mode are f/2.8, f/8.4, and f/16.8, respectively. Therefore, the aperture values set in the live view mode are f/2.8, f/8.0, and f/8.0, respectively.

This is to prevent image degradation such as darkening, increased noise, decreased frame rate, etc. when taking a picture of a normal subject. In this case, the upper limit of narrowing the aperture is set to 8.0.

In the first embodiment, the aperture 102 is initialized properly in step S2 before the sub-imager 23 is turned on.

Thus, according to the first embodiment, since the aperture value setting is controlled for the live view mode, the possibility of damaging the imager upon framing can be decreased.

Second Embodiment

The following describes a second embodiment of the present invention.

In the first embodiment, a live view is displayed using the sub-imager provided in the finder optical system, while in the second embodiment, a live view is displayed through the main imager without using the sub-imager.

In the second embodiment, a camera body 10' has the same structure as the camera body 10 in the first embodiment, except that an AF/AE optical system and an AF/AE sensor are arranged in the position of the sub-imager in the first embodiment, and that the position of the focusing screen is different from that in the first embodiment. There is no change in the interchangeable lens from that in the first embodiment shown in FIG. 3. Therefore, portions common to those in the first embodiment are given the same reference numerals and their repetitive description will be omitted. In other words, only the portions different from those in the first embodiment will be described below.

Figure 7:
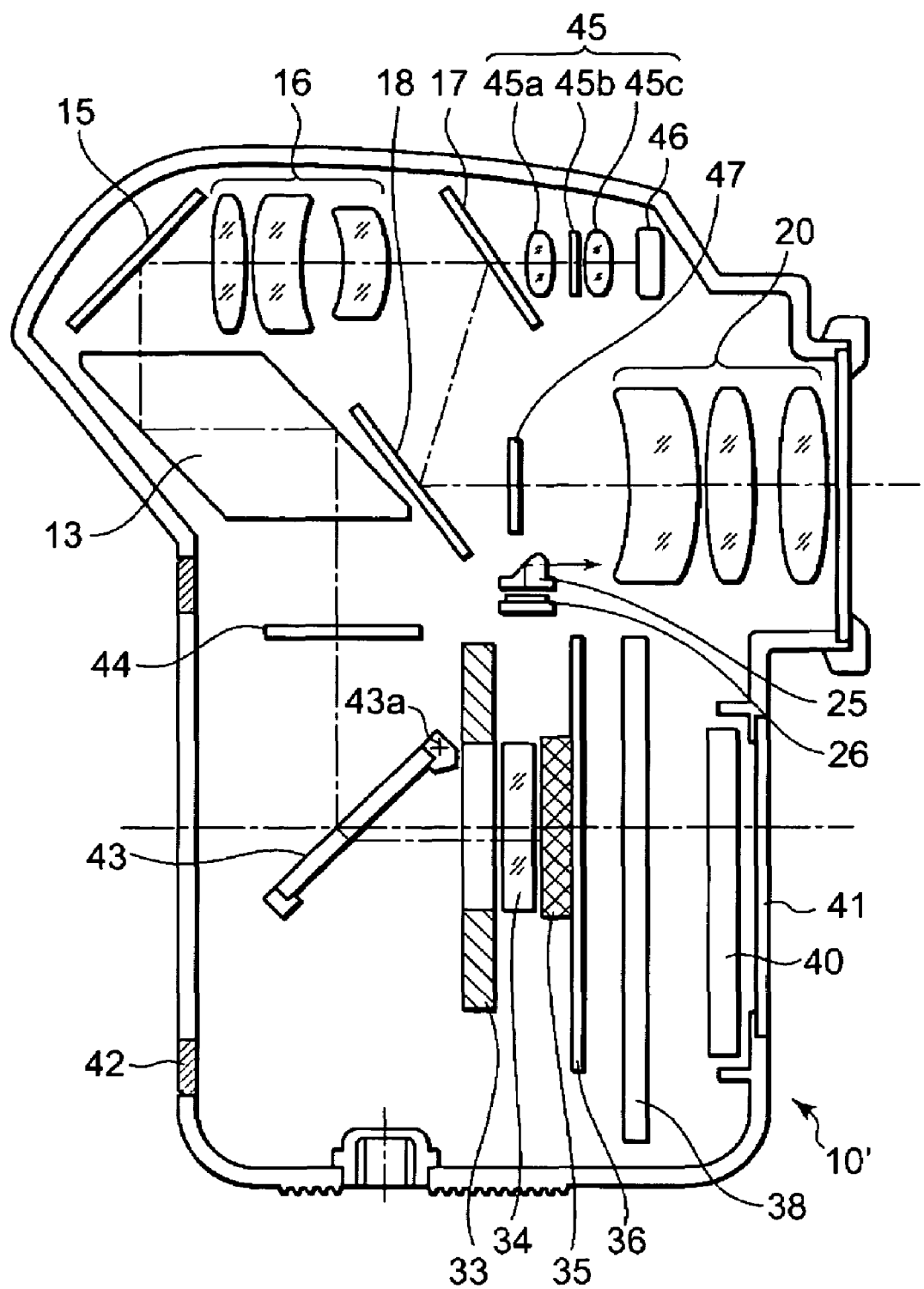
FIG. 7 is a sectional view showing the structure of the body section of a single-lens reflex digital camera according to a second embodiment of the present invention, in which the camera state during viewing of a subject field is shown.
Figure 8:
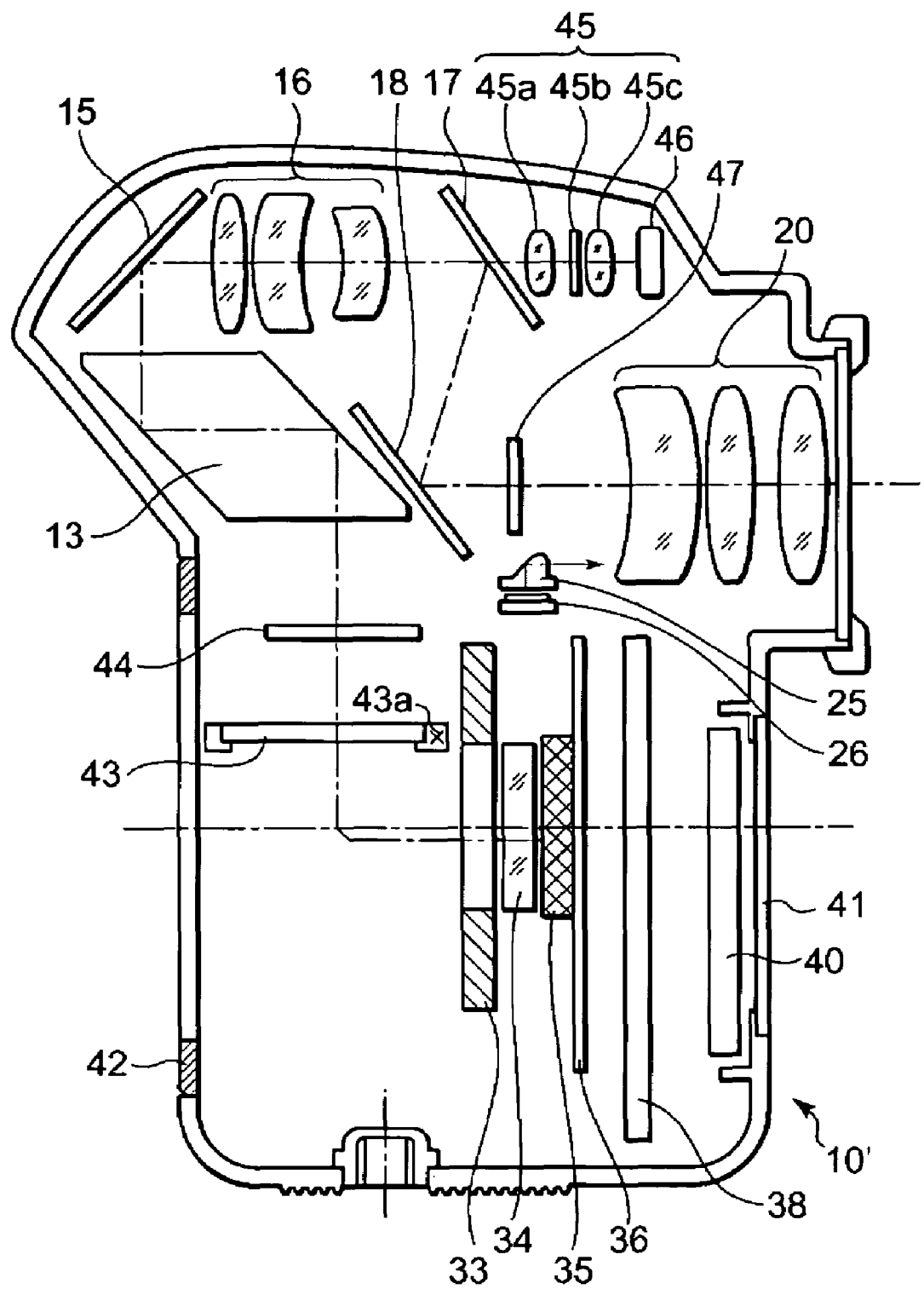
FIG. 8 is a sectional view showing the structure of the body section of the single-lens reflex digital camera according to the second embodiment of the present invention, in which the camera state upon shooting is shown.

FIGS. 7 and 8 are sectional views showing the structure of the body section of a single-lens reflex digital camera according to the second embodiment of the present invention. FIG. 7 shows the camera state during viewing of a subject field, and FIG. 8 shows the camera state upon shooting.

In FIGS. 7 and 8, this camera consists principally of the interchangeable lens 80 (not shown) and the camera body 10' as the camera body section. Any desired interchangeable lens 80 can be removably set on the body mount 42 provided on the front of the camera body 10'.

In FIG. 7, a light beam coming from a subject through an interchangeable lens 80 (not shown) is reflected on the surface of a main mirror 43, part of which is formed into a half mirror, and is incident on the prism 13 through a cover glass 44. The light beam of the subject incident on the prism 13 reaches the eyepiece lens 20 through the reflection surfaces inside the prism 13, the mirror (A) 15, the relay lens 16, the mirror (B) 17, the mirror (C) 18, and a focusing screen 47.

The main mirror 43 is provided rotatably about an axis 43a. During viewing of a subject field, the main mirror 43 is located in the shooting optical path as shown in FIG. 7. Then, at the time of shooting, the main mirror 43 is moved to a position retracted from the shooting optical path as shown in FIG. 8. The focusing screen 47, arranged between the mirror (C) 18 and the eyepiece lens 20 as mentioned above, forms a subject image from the light beam taken in the camera body 10'.

The mirror (B) 17 is a half mirror so that part of the incident light will pass through the mirror (B) 17 and be guided to an AF/AE sensor 46 for auto focusing and light metering through an AF optical system 45 arranged behind the mirror (B) 17. The AF optical system 45 consists of a condenser lens 45a for condensing the light beam, a separator aperture 45b for limiting the amount of light, and a separator lens 45c for re-focusing the light beam.

Figure 9:
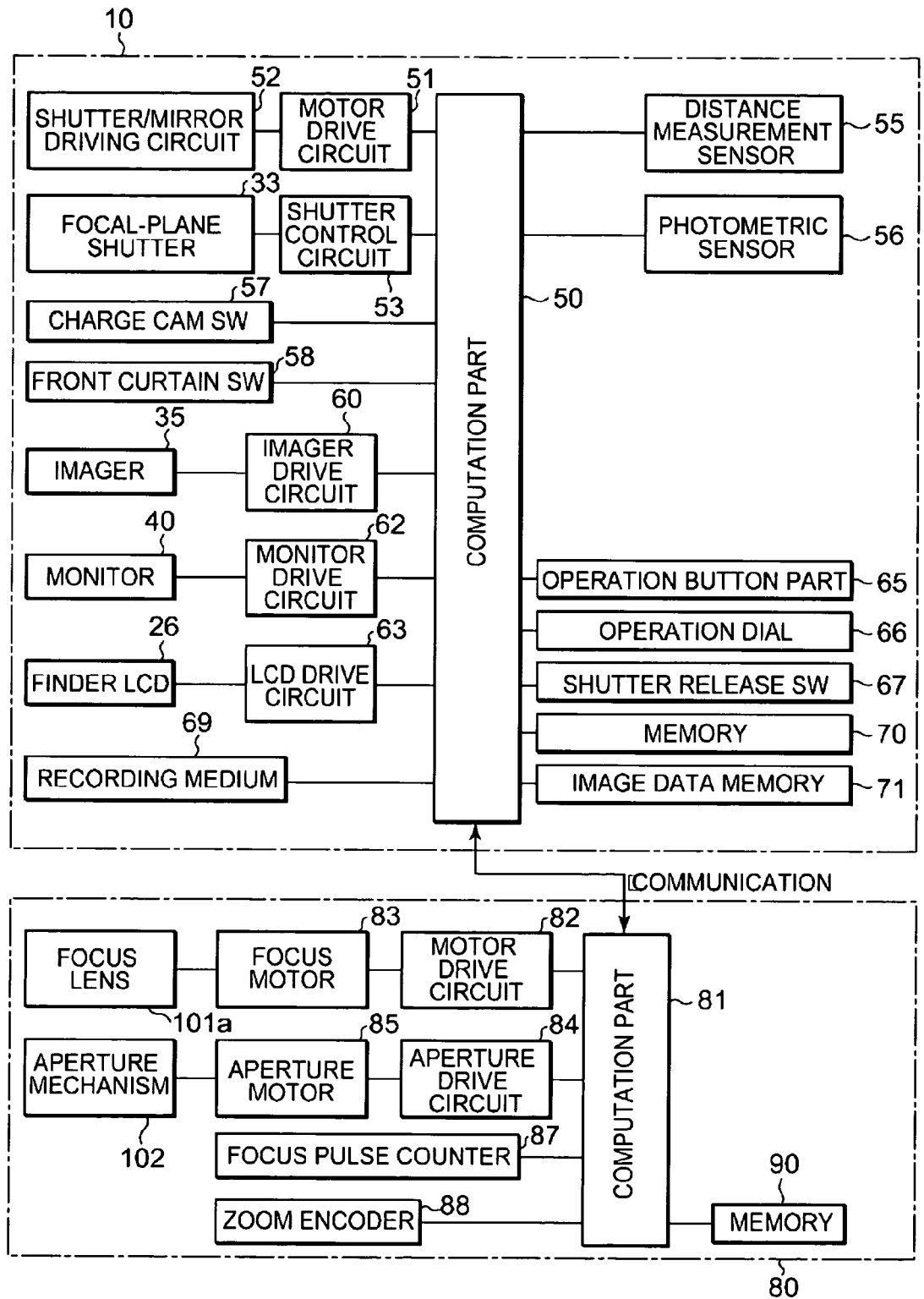
FIG. 9 is a block diagram showing the structure of an electric system of the single-lens reflex digital camera according to the second embodiment of the present invention.

FIG. 9 is a block diagram showing the structure of an electric system of the single-lens reflex digital camera according to the embodiment of the present invention. This block diagram shows a state in which an interchangeable lens is mounted on the camera.

A point different from the camera body 10 of the first embodiment shown in FIG. 4 is that the camera body 10' of the second embodiment shown in FIG. 9 does not have the sub-imager 23 and the sub-imager drive circuit 61. The other structural elements are the same as those of the camera body 10 in FIG. 4. Therefore, since the structure and operation of each element of the camera body 10' can refer to those of the first embodiment shown in FIG. 4, their repetitive description will be omitted.

The following describes the operation of the camera according to the second embodiment of the present invention.

Figure 10:
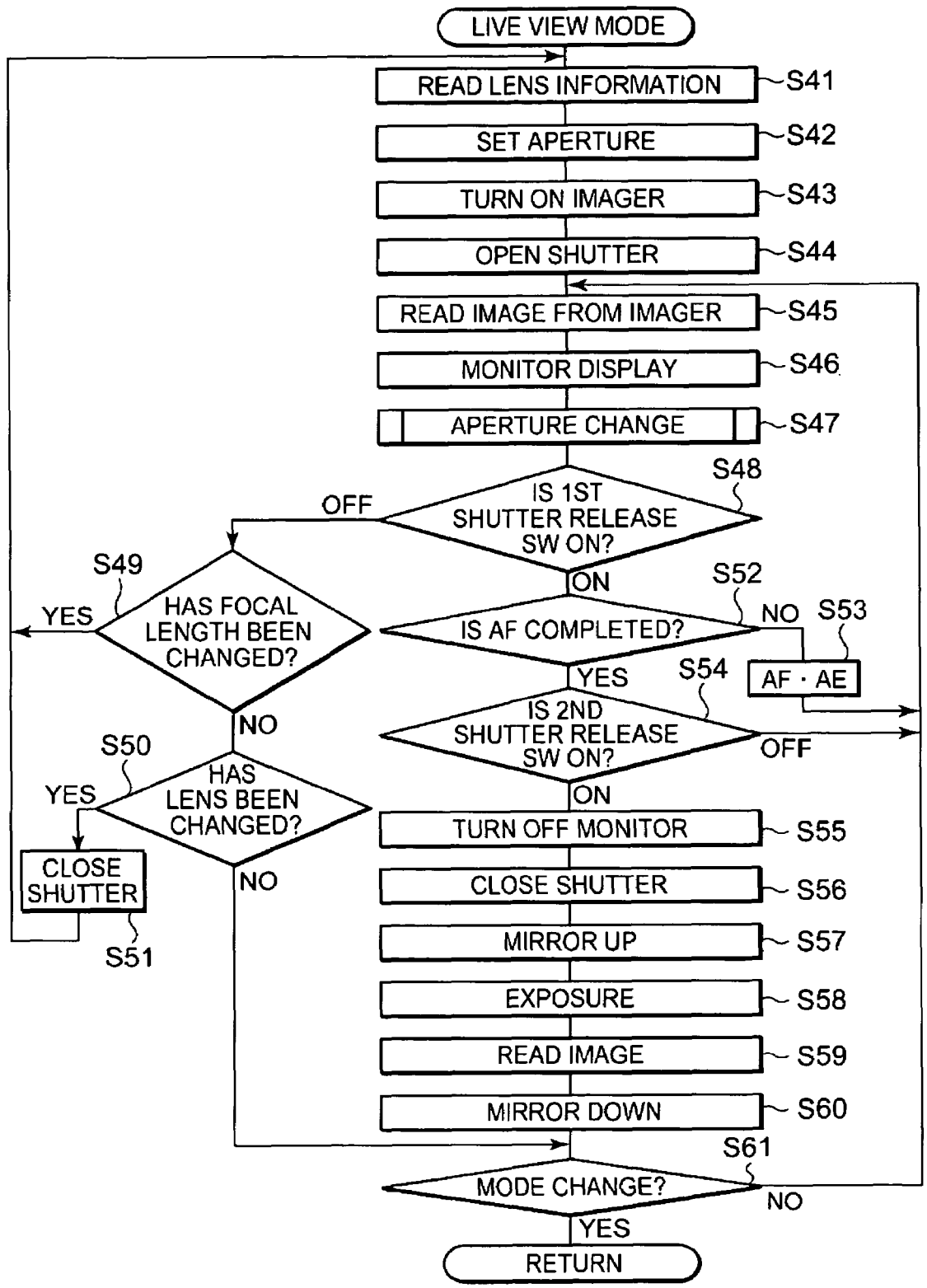
FIG. 10 is a flowchart for explaining the operation of the camera in the live view mode according to the second embodiment of the present invention.

When a mode setting button, not shown, is operated to select the live view, the camera enters the live view mode to call a sub-routine for the live-view mode shown in FIG. 10 from a main routine (not shown).

FIG. 10 a flowchart for explaining the operation of the camera in the live view mode according to the second embodiment of the present invention. This operation of the camera is performed primarily under the control of the computation part 50 in the camera body 10'.

When the computation part 50 enters the routine of the live view mode, communication is first performed in step S41 with the side of the interchangeable lens 80 to read the lens information on the interchangeable lens 80 from the computation part 81. The lens information includes, for example, information on the minimum aperture, the maximum aperture, the focal length, etc., of the interchangeable lens 80. Then, in step S42, the aperture is initialized. Here, an aperture value other than the maximum is set. Note that, if the initialization procedure is done for a second or further time, the initial aperture value is set according to the aperture value changed in a sub-routine "Aperture Change" in step S47 to be described later.

In step S43, the imager 35 is turned on through the imager drive circuit 60, and in step S44, the focal-plane shutter 33 is opened through the shutter control circuit 53. Then, in step S45, a subject image captured by the imager 35 is read. Further, in step S46, the subject image read in step S45 is displayed on the monitor 40. Thus, a live view is displayed through the imager 35. Next, in step S47, the sub-routine "Aperture Change" is executed. Since the sub-routine "Aperture Change" in step S47 is the same as that shown in the flowchart of FIG. 6, its description will be omitted.

Next, in step S48, the state of the first shutter release switch is determined. If the first shutter release switch is not on-state, the procedure proceeds to step S49 to determine whether the focal length of the interchangeable lens 80 currently mounted has been changed. As a result of determination, if the focal length has been changed, the procedure returns to step S41 to repeat the above-mentioned processing. On the other hand, if the focal length of the lens has not been changed, the procedure proceeds to step S50 to determine whether the lens has been changed. If the lens has been changed, the procedure proceeds to step S51 to close the shutter to protect the imager 35. After that, the procedure returns to step S41 to repeat the above-mentioned processing. Meanwhile, if it is determined in step S50 that the lens has not been changed, the procedure shifts to step S61 to be described later.

On the other hand, if the first shutter release switch is turned on in step S48, the procedure proceeds to step S52 to determine the state of AF. As a result, if AF is not completed yet, the procedure proceeds to step S53 to execute AF and AE. After that, the procedure returns to step S45 to repeat the above-mentioned processing. When AF is completed in step S52, the procedure proceeds to step S54 to determine the state of the second shutter release switch. If the second shutter release switch is not on-state, the procedure returns to step S45 to repeat the above-mentioned processing.

On the other hand, if the second shutter release switch is turned on in step S54, the procedure proceeds to step S55 to turn off the monitor 40. Then, in step S56, the shutter control circuit 53 closes the focal-plane shutter 33. Then, in step S57, the shutter/mirror driving motor 52 moves the main mirror 43 up. In other words, the main mirror 43 is moved from the shooting optical path as shown in FIG. 7 to the retracted position as shown in FIG. 8. Further, in step S58, the imager 35 is exposed to light to capture a subject image. Then, in step S59, the subject image captured is read.

After that, in step S60, the shutter/mirror driving motor 52 moves the main mirror 43 down (to return to the shooting optical path shown in FIG. 7 from the retracted position shown in FIG. 8). Then, it is determined in step S61 whether the mode has been changed. If the camera is still in the live view without any mode change, the procedure returns to step S45 to repeat the above-mentioned processing. On the other hand, if the mode has been changed, the procedure exists from this routine and returns to the main routine, not shown.

In the second embodiment, the aperture 102 is initialized properly in step S42 before the imager 35 is turned on.

Thus, according to the second embodiment, since the aperture value setting is controlled for the live view mode, the possibility of damaging the imager upon framing can be decreased.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. A digital camera having a live view mode for continuously capturing and displaying a series of subject images, comprising:

a memory part storing photographing lens-specific information;

an aperture mechanism for adjusting the amount of incident light from the subject;

a light metering part for measuring a brightness of the subject; and a computation part for controlling the aperture mechanism, wherein the computation part reads the photographing lens-specific information from the memory part, and when all three of (1) the live view mode is selected, (2) a diameter of a maximum open aperture included in the photographing lens-specific information is larger than a first predetermined value, and (3) the brightness of the subject is higher than a second predetermined value, the computation part initializes the aperture mechanism such that an aperture value other than the maximum open aperture is set by the aperture mechanism.

2. The digital camera according to claim 1, wherein the computation part initializes the aperture mechanism such that the amount of light from the sun per unit area, or the total amount of light from the sun, will be initialized to a given value, regardless of the kind of photographing lens.

3. The digital camera according to claim 1, wherein the computation part changes the set aperture value of the aperture mechanism based on the light metering results from the light metering part during the live view mode.

4. The digital camera according to claim 1, wherein the photographing lens is an interchangeable lens, and when the photographing lens has been changed, the computation part re-executes the aperture value setting operation.

* * * * *